FIG.1.

3,341,695
RATEMETERS
Charles Holmes Vincent and John Brian Rowles, Basingstoke, England, assignors to United Kingdom Atomic Energy Authority, London, England
Filed Aug. 5, 1963, Ser. No. 299,831
Claims priority, application Great Britain, Aug. 16, 1962, 31,568/62
4 Claims. (Cl. 235—152)

This invention relates to electrical pulse ratemeters, for providing an indication of the rate of arrival of electric pulses at an input point convenient for the ratemeter.

Up to now such ratemeters have been of the type in which the pulses are shaped to have the same charge characteristics and the shaped pulses are fed into a capacitor which is provided with a leakage path. The charge in the capacitor at any instant is a measure of the rate of arrival of the pulses. These ratemeters have the disadvantage that they are not truly linear, that is to say, the charge in the capacitor does not rise linearly with a rise in the rate of arrival of the electrical pulses. The non-linearity can be compensated to some extent by various means and many ratemeter circuits have been devised to provide such compensation. The compensation cannot, however, totally eliminate the non-linearity.

Known ratemeters based on capacitors have other disadvantages, among which is the alteration of the capacitor characteristics as the dielectric materials age. This effect is variable and no satisfactory means has yet been found to compensate for it.

A further disadvantage with known ratemeters is found when it is desired to have a very long time-constant ratemeter. It is necessary to use a high resistance leak or a very large capacity system, or both. Such systems are difficult and expensive to construct and difficult to control.

This invention provides a ratemeter which is not subject to any of the above disadvantages.

It provides a ratemeter which does not base itself on a capacitor but uses a digital technique.

The ratemeter of the invention has, furthermore, certain advantages including very high accuracy, linearity in action, freedom from saturation, and easily variable time constant.

The invention consists in an electrical pulse ratemeter which comprises a digital addition circuit adapted to receive electrical pulses and add one unit for each electrical pulse, means for subtracting at predetermined intervals of time a number forming a constant fraction of the number in the digital addition circuit, and means for exhibiting a reading corresponding to the number forming the constant fraction so subtracted.

The subtraction may be carried out by any convenient means as known in the digital computer art. It is preferred that binary arithmetic be used and the subtraction carried out by adding to the reading the 1's complement of the fraction and providing an "end-around carry" as discussed hereinafter.

In operation the ratemeter functions as follows:
The digital addition circuit adds the pulses and the reading in the circuit rises until the fraction subtracted after the interval of time is equal to the number of pulses arriving in the said interval. The equilibrium reading is thus a measure of the rate of arrival of the pulses.

A short discussion of the arithmetic involved in the invention will now be given.

As is known, any number N may be represented as $$N = \sum_{i=o}^{i=n} a_i b^i$$

where $b$ is the base, $i$ is any number, having a smallest whole number value $o$ and a largest whole number value $n$, and $a_i$ is the digit associated with any particular value of $i$.

The complement C of the number N is usually taken to be $$C = b^{n+1} - N$$

It is often not possible to form this complement because the digital system may not have sufficient stages to realize the number $b^{n+1}$. Thus for example an eight-stage binary scaler can add up to a total which is one digit below $2^8$. It cannot show $2^8$ because this would require a ninth stage. The number $2^8$ would thus be indistinguishable from zero. In such cases the complement is formed on $b^{n+1} - b^o$, i.e. $b^{n+1} - 1$. In the binary system this is termed the 1's complement. The only other possible complement in binary is the above-mentioned complement formed on $b^{n+i}$, which is termed the 2's complement.

When the complement which is added to effect subtraction is formed on $b^{n+1} - 1$, resulting answer is too small by one unit in the least significant position and it is necessary to provide some means to add this unit to the answer. One convenient means, known as "end around carry," is for the digital system to provide a single output pulse after the complement has been added, which output pulse is fed into the first stage corresponding to the least significant digit position.

If the fraction subtracted is $N/bP$ where P is a number and the time between successive subtractions is $T_s$, the time constant $T_c$ is given by $T_c = bPT_s$. At equilibrium the input pulse rate R is given by $R = N/T_s bP$.

Following the above brief discussion, a description of an embodiment of the invention will now be given with reference to the accompanying drawings in which:

FIGURE 1 is a block diagram of a twenty stage binary digital addition circuit designed to subtract a fraction $(\frac{1}{2})^{10}$ of the total sum in the addition circuit from the total sum.

Figure 1:
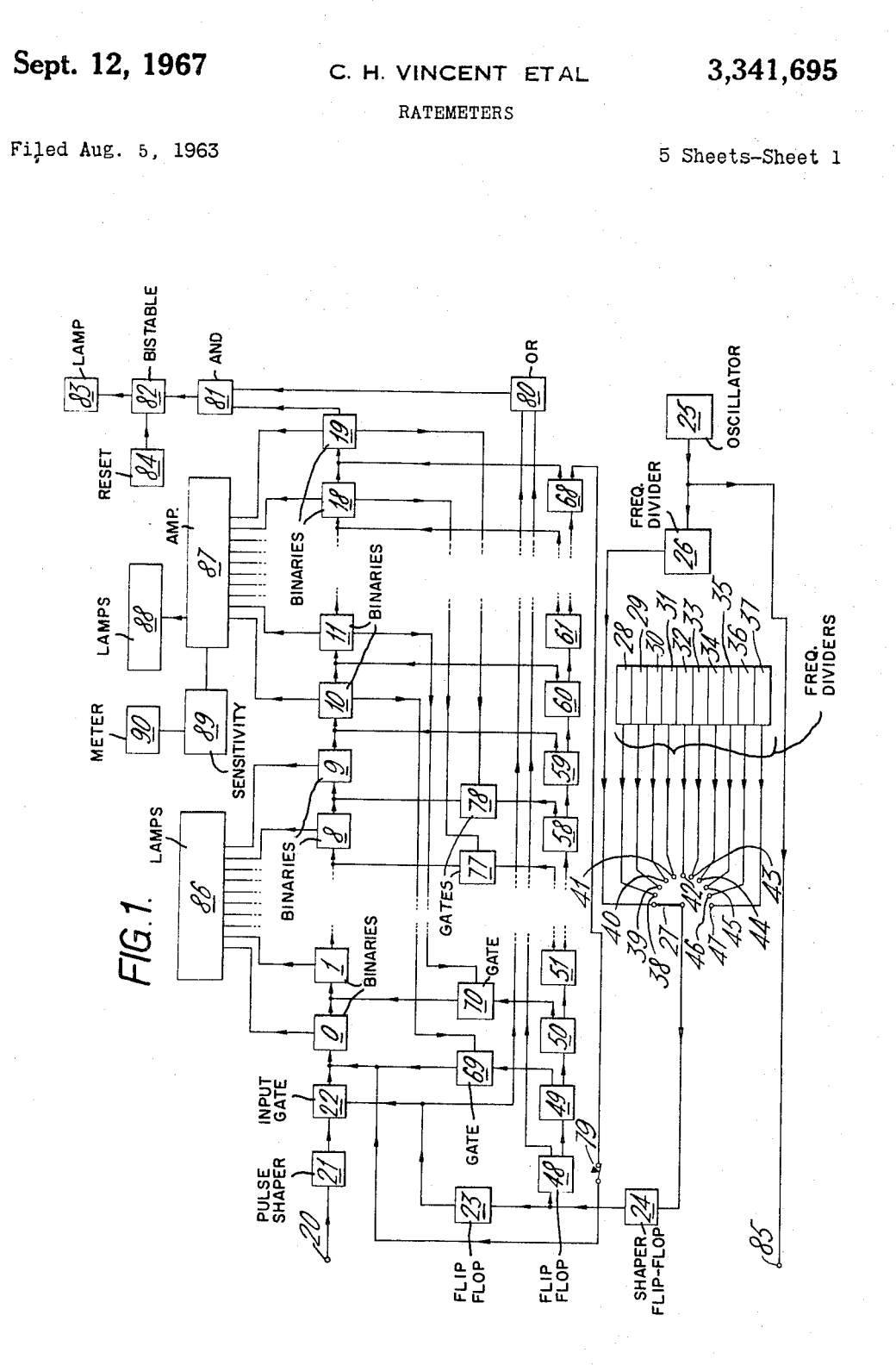
Figure 2:
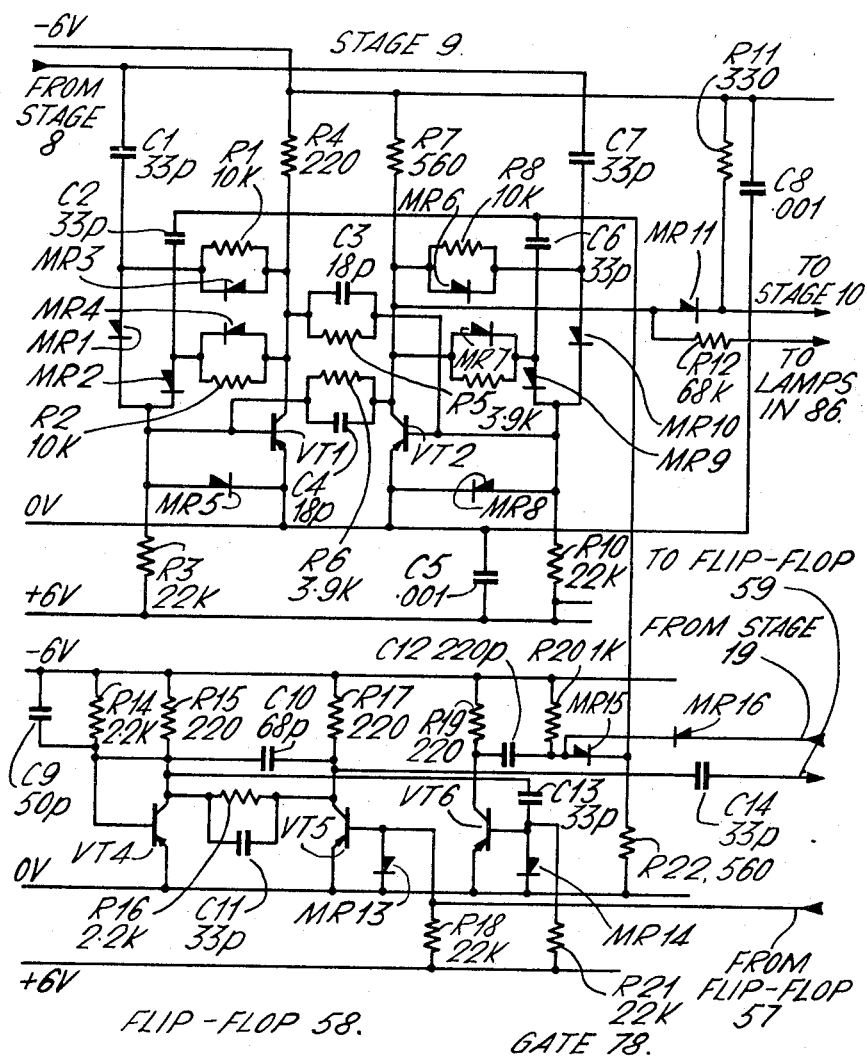
FIGURE 2 is a circuit diagram of binary stage $2^9$ and its associated flip-flop and gate.

In FIGURE 1 the digital register is composed of twenty binary stages indicated by reference numerals 0 to 19, for simplicity some are omitted from the drawings. The numeral for each stage indicates the power of 2 to which the stage corresponds.

Input pulses to be counted enter the circuit at 20, pass through a pulse shaper 21 and reach stage 0 through a gate 22. Gate 22 is controlled by a flip-flop 23 which is connected to be triggered by a pulse from a shaper flip-flop 24 so as to close the gate for 3 microseconds. A crystal oscillator 25 is connected via a first frequency divider 26 and switch 27 to shaper flip-flop 24. One or more of the further frequency dividers 28 to 37 can be connected betwen frequency divider 26 and shaper flip-flop 24 by setting switch 27 at any of terminals 38 to 47 as desired, so that the frequency of the pulses arriving at shaper flip-flop 24 can be varied within wide limits.

A flip-flop 48 is connected to receive a pulse from shaper flip-flop 24 and to pass a pulse to a series of flip-flops 49 to 68 after a delay of 0.5 microsecond sufficient to allow stage 10 and gate 69 controlled by it to reach their final state after the closing of the input gate. Gates 69 to 78 respectively are connected between flip-flops 49 to 58 and stages 0 to 9 respectively. Gate 69 is controlled by stage 10, gate 70 is controlled by stage 11 and so on to gate 78 being controlled by stage 19. Flip-flops 49 to 58 provide immediate output pulses to gates 69 to 78, and flip-flops 59 to 68 provide immediate output pulses to stages 10 to 19. Flip-flops 49 to 67 also provide pulses to the following flip-flops after a delay of 0.1 microsecond.

Flip-flop 68, as well as being connected to stage 19, is connected via switch 79 to stage 0 thereby providing the requisite "end around carry." It supplies a pulse to stage 0 after a delay of 0.1 microsecond.

An OR "circuit 80" is connected to flip-flops 23 and 48 so as to receive an input from either, and its output is fed to an AND circuit 81 which can also receive a pulse from stage 19 every time stage 19 goes from the 1 state to the 0 state. The AND circuit 81 is connected to trigger a bistable circuit 82 which operates a lamp 83.

A manual reset switch 84 is connected to reset bistable circuit 82 from its triggered state to its quiescent state.

A terminal 85 is provided for testing the oscillator 25. The output from this terminal can also be connected to the input terminal of the ratemeter as a means of checking the correct action of the said ratemeter.

A variable amplifier 87 has two outputs, one to a set of lamps in circuit 88 which indicate the states of stages 10 to 19, and one to an ammeter 90 calibrated to give a reading in decimal arithmetic corresponding to the binary reading in lamps 88, the ammeter having a variable sensitivity control 89.

In operation of this circuit, pulses enter at input point 20 are shaped in pulse shaper 21 and, when gate 22 is open, pass to stage 0. The pulses are counted by the 20 stages. After an interval of time, predetermined to be shorter than the time required to convert all the stages to the 1 state from the 0 state, a fraction $½^{10}$ of the reading of the stages is subtracted from the reading.

The subtraction is carried out as follows:

The settings of stages 10 to 19 considered in isolation from the settings in stages 0 to 9 give the reading corresponding to $½^{10}$ of the total reading (accurate to the next digit below). The 1's complement of this reading is obtained by subtracting this reading from $2^{20}-1$. In binary notation it so happens that this complement can be obtained by a short cut which comprises writing out the binary number in full with the digits positioned to be significant with respect to $2^{19}$, and converting all the 0 digits to 1 digits and the 1 digits to 0 digits.

This number plus 1 is then added to the reading in the stages 0 to 19. This operation is carried out by gates 69 to 78 and flip-flops 49 to 68. Each gate is set to be open when its controlling stage is in the 0 state and closed when its controlling stage is in the 1 state.

The flip-flops inject a pulse directly into each stage except when prevented by the setting of a gate. The effect of this is to add to the reading a number in which the ten digits $2^0$ to $2^9$ have been converted as above and the ten digits $2^{10}$ to $2^{19}$ are all unity. Flip-flop 68 also supplies a pulse directly to stage 0 thereby adding 1 to the answer The answer is equal to $2^{20}$ plus the reading in the stages minus $½^{10}$ of the reading. Since however $2^{20}$ is equivalent to zero on the twenty stage circuit, the reading in the stages provides the answer after the subtraction. This answer differs from the original reading by only $½^{10}$ of the reading, that is by an amount less than 1 digit in the $2^{10}$ position. The reading in the stages 10 to 19 eventually assumes an equilibrium value which is within unity of the number of pulses arriving in the period between subtractions.

It is obvious that the period between subtractions must not be so great that $2^{10}$ or more pulses arrive at input 20. If all the stages are filled before a subtraction occurs a pulse from stage 19 is passed through circuit 81 to bistable circuit 82 to light lamp 83.

The circuits will now be described in more detail.

In FIGURE 2, binary stage 9, VT1 and VT2, is a saturated type circuit with two sets of input steering diodes MR1, MR2, MR9 and MR10, to direct either the positive carry pulse from stage 8, or the positive complement pulse from gate 78, to the appropriate transistor base, to switch the transistor off. This circuit is capable of scaling at 50 mc./s. or more. A current is taken out, via the 68KΩ resistor R12, to the corresponding lamp circuit 86, to indicate the state of the stage. This current is used to switch the lamp on when the binary is in the 1 state. The circuit for the lamps is similar to that of the circuit 88, lamps shown in FIGURE 5. When stage 9 is triggered to the 0 state, a positive carry pulse is fed via diode MR11 to trigger the next stage. The circuits for stages 1 to 9 are identical. The circuit for stage 0 differs in the method of feeding on the carry pulse to the stage 1. In this circuit, the cross-coupling resistors R5 and R6 are increased from 3.9KΩ to 5.6KΩ, R4 becomes 560Ω, and the diode MR11 and the resistor R11 are omitted. The carry pulse is fed on via an emitter-follower. This emitter-follower is present only in stage 0. The voltage drop across the base-to-emitter junction of the emitter-follower and the voltage drop across an added diode is used as a discrimination level, to prevent small amplitude pulses which do not trigger stage 0 being amplified and passed on to trigger stage 1. These small pulses arise from the fact that the input pulses are arriving randomly with respect to the opening and closing of the gate 22 and therefore some of them can be chopped, producing small pulses. Such small pulses can cause errors in scalers by triggering later stages, unless there is such a discriminator action to prevent it happening.

The flip-flop 58, VT4 and VT5 provides a delay of approximately 100 ns. It is triggered by a negative pulse which is fed from flip-flop 57 to the base of VT5 and passes a pulse to the gate diode MR15 immediately, via the buffer stage VT6. When the flip-flop returns to its quiescent state, a negative pulse is fed out via C14 to trigger flip-flop 59. The flip-flops 49 to 58 are all identical.

The diode MR15, and its associated circuits form the gate 78. If the input bias voltage, coming via MR16 from the stage 19 is 0, the gate diode MR15 is forward biased, so that when the flip-flop 58 goes to its quasi-stable state, a negative pulse is inverted by the buffer stage VT6 and passed via MR15 to stage 9. If the bias voltage from stage 19 is −5.5 v., that is, if the stage is in the 1 state, the diode MR16 will cut off and the gate diode MR15 will be reverse biased, thus blocking pulses from the flip-flop 58. The gates 69 to 78 are all identical.

Figure 3:
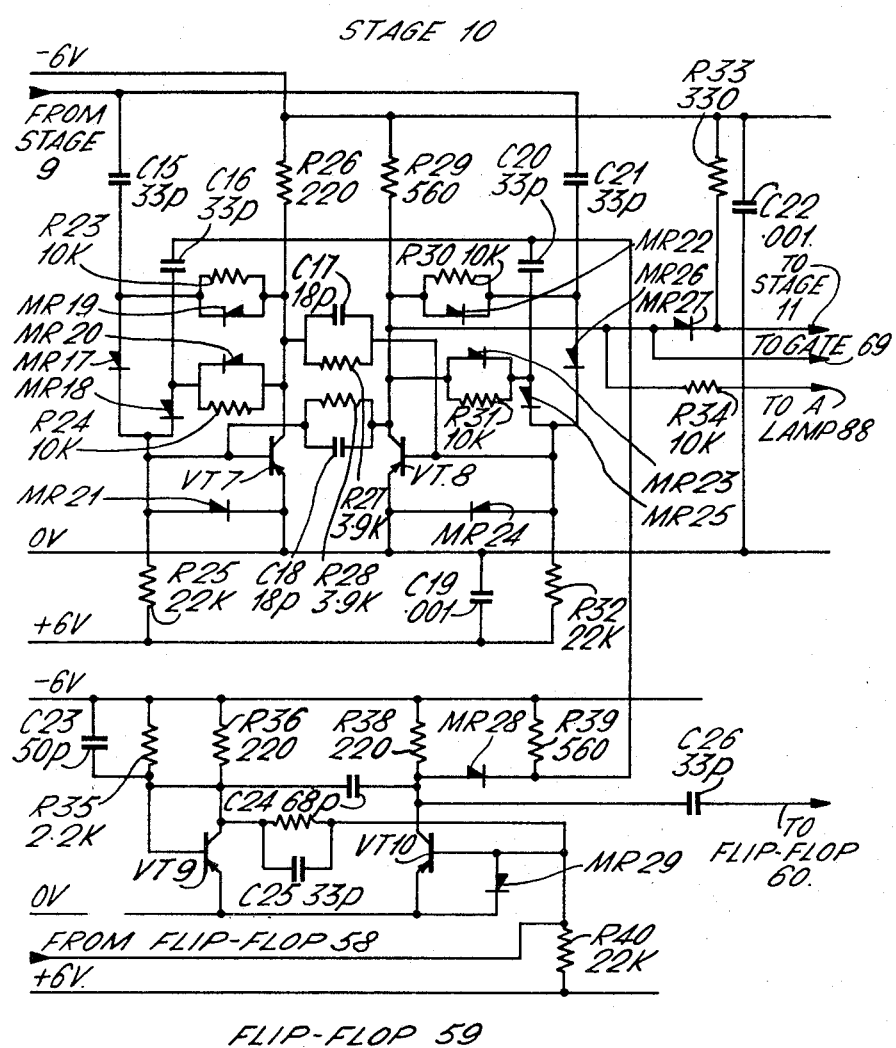
FIGURE 3 is a circuit diagram of binary stage $2^{10}$ and its associated flip-flop.

In FIGURE 3 stage 10, VT7 and VT8 is identical to stage 9 which has already been described in FIGURE 2, except that the display output is taken via the 10KΩ resistor R34 to the lamp circuit 87. This is also true of the other binary stages 11 to 19, except that the carry output from stage 19 is taken from the opposite side to that shown in the figure, directly from the collector, in order to obtain a negative output pulse, which is fed to the off-scale AND circuit 81 whenever the scaler completes its cycle and returns to zero.

The flip-flop 59, VT9 and VT10, is identical to the flip-flop 58 (FIGURE 2) except that the positive complement output pulse is taken from the collector of VT10 and fed, via the diode MR28, straight to stage10. The flip-flops 59 to 68 are all identical.

Figure 4:
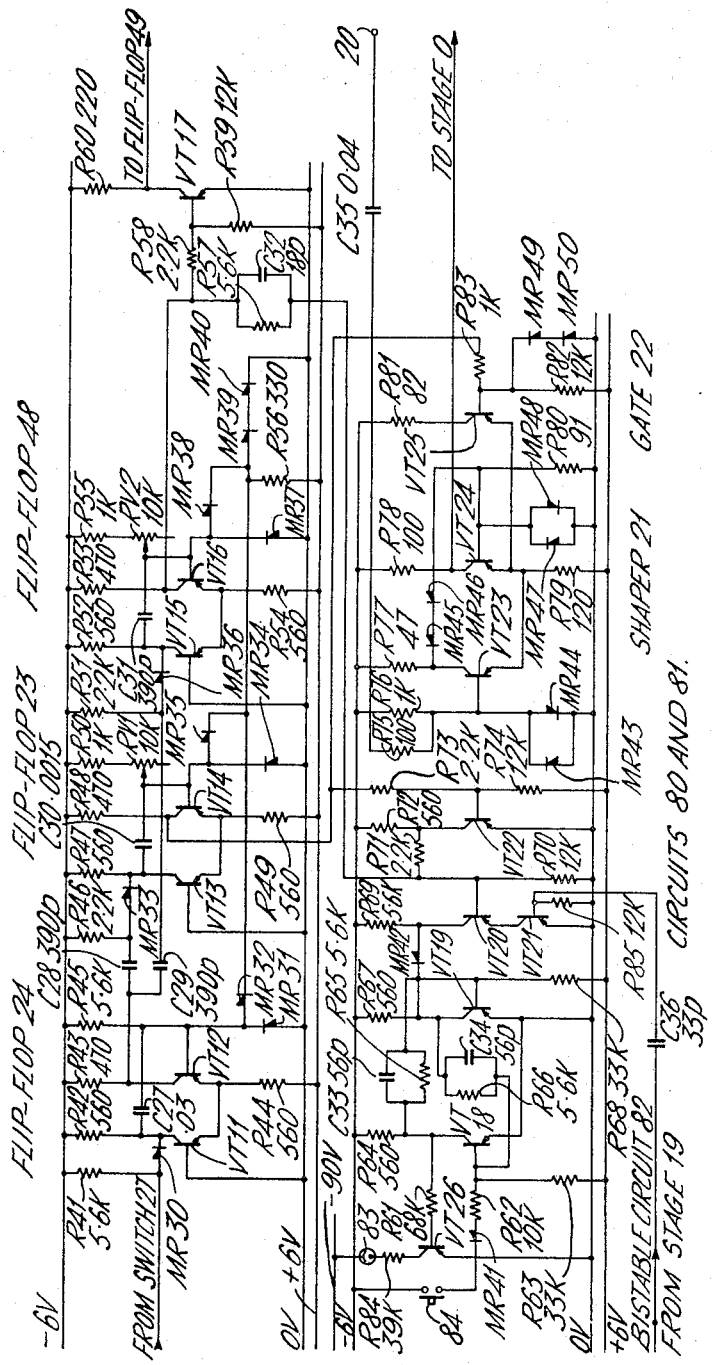
FIGURE 4 is a circuit diagram of some flip-flops and associated circuits as will be identified later.

In FIGURE 4, flip-flop 24 is formed by the transistor VT11 and VT12. It accepts relatively slow pulses from the switch 27 (FIGURE 1) and shapes them to trigger the 3 μs. flip-flop 23 and the 0.5 μs. flip-flop 48.

Flip-flop 23 is formed by the transistors VT13 and VT14, and is used to close gate 22 for the duration of the subtraction period. It also removes one of the inputs from the AND circuit 81 via the OR circuit 80, for the same period.

Flip-flop 48 is formed by transistors VT15 and VT16, and it is triggered by flip-flop 24 at the same time as flip-flop 23 is triggered. The output from flip-flop 48 is used to trigger the flip-flop 49 (FIGURE 1), and thus start the subtraction 0.5 μs. after the gate 22 has closed.

Flip-flop 48 is also used to provide an input to the AND circuit 81, via the OR circuit 80, for a further 0.5 μs. after the input gate has closed. This ensures that any pulse which happens to be in transit through the binaries at the time the input gate closes and which is going to complete the cycle of the scaler is able to operate the bistable circuit 82, via stage 19 and the AND circuit 81, before the latter is set to block the carry pulse at the subtraction.

Pulse shaper 21 and gate 22, formed by transistors VT23, VT24 and VT25, are inseparable because of their operation. When gate 22 is open, the current flowing through R79 is switched from VT23 to VT24 by each of the positive input pulses, for which the rate is to be determined. The positive output pulses from the collector of VT24 are passed to stage 0 to be counted. For a period of 3 μs., the subtraction period, flip-flop 23 holds the transistor VT25 switched on and all the current flowing in the resistor R79 is switched into the transistor VT25. Thus there is no current available for the input pulses to switch between the transistors VT23 and VT24. This directly coupled shaper and parallel type gate will resolve between two 10 v., 5 ns. input pulses which are 20 ns. apart. It will also deal with a 5 v. input pulse with a rise-time of 10 μs. Although the transistor VT23 is 2N769, having a maximum reverse emitter-to-base voltage of only 2 v., positive input pulses of up to 20 v. can be applied to the input (limited by the current rating of the diode MR44). This is possible because the base of VT23 is a low-impedance point, due to the diodes MR43 and MR44. Hence the resistor R75 acts as a matched termination to the 100Ω impedance input co-axial cable connected to 20. There is sufficient voltage developed across the diode MR44 in the forward direction to operate the circuit.

Circuits 80 and 81 are formed by VT20 and VT21. The input base current to VT20 is taken via the buffer stage VT22 from the 3 μs. flip-flop 23, when the latter is in its quiescent state, or from the 0.5 μs. flip-flop 48, when that is in its quasi-stable state, but is removed altogether for the remaining 2.5 μs. of each cycle, cutting the transistor off. Every time stage 19 goes from the 1 state to the 0 state, a negative output pulse (specially taken from this stage only) is fed into the base of VT21. It is inverted and fed the diode MR42 to trigger the bistable circuit 82, except during the 2.5 μs. interval at each subtraction when VT20 is cut off and does not permit this.

Bistable circuit 82, composed of transistors VT18 and VT19 is a conventional bistable circuit which is triggered to its 1 state by the positive pulse from the AND circuit 81. Once it is triggered into the 1 state, it will stay in that state until the manual reset switch 84 is operated. It controls the lamp 83 by means of the transistor VT26.

Figure 5:
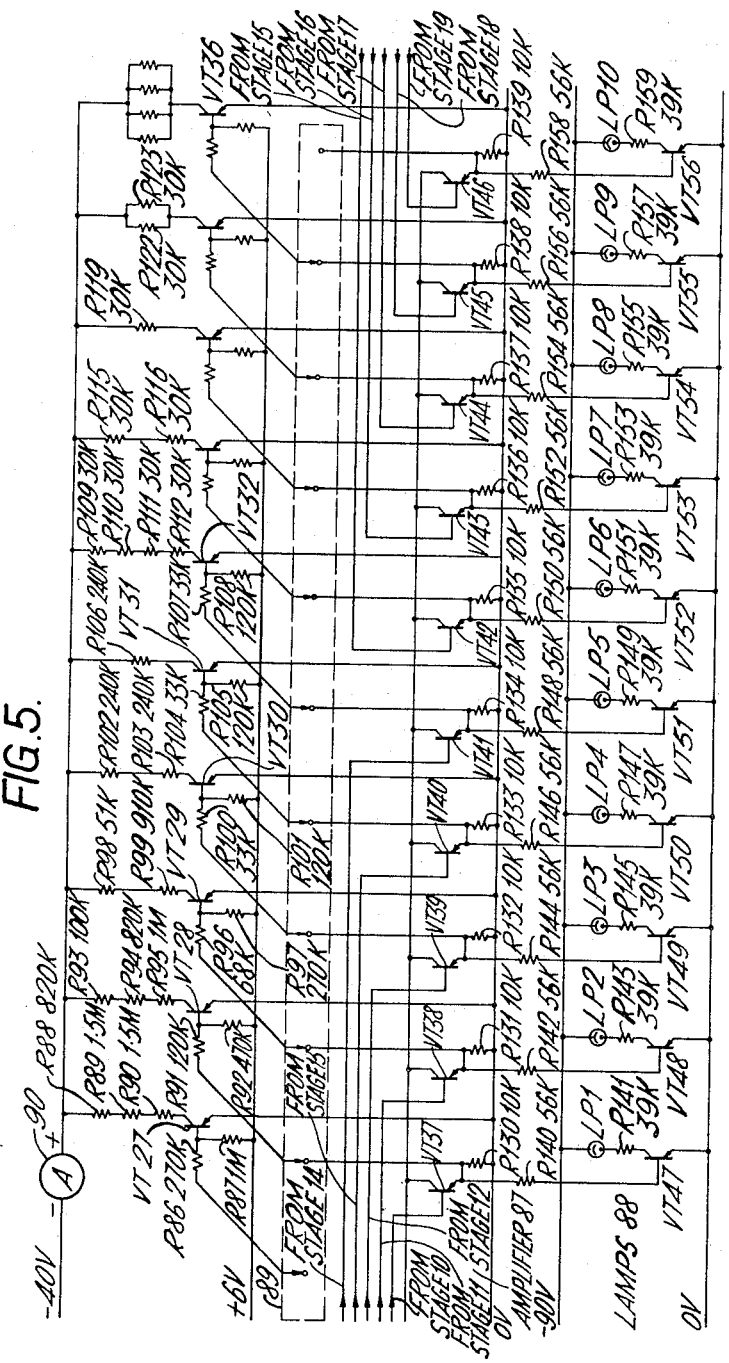
FIGURE 5 is a circuit diagram of lamps and meter circuits for binary stages 10 to 19.

In FIGURE 5 the outputs from the stages 10 to 19 are taken to buffer emitter-followers VT37 to VT46. The emitter-followers, in turn, switch on the appropriate transistors VT47 to VT56, causing the corresponding neon lamps LP1 to LP10 to light. The emitter-followers VT37 to VT46 also control the switching transistors VT27 to VT36 in the circuits to ammeter 90. Their emitter voltages are about 0 v. for stages that are at 0 and about −5 v. for stages that are at 1.

With an oscillator 25 having a frequency of $2^{14}$ c./s., the output being passed through a frequency divider 26 which divides by $2^4$, it is simple to arrange for frequency dividers 28 to 37 to cover the range $2^9$ to $2^0$ c./s., the $2^{10}$ frequency being fed directly to switch 27. The time between subtractions can thus be varied accurately from 1 second to $\frac{1}{2}^{10}$ seconds, that is a decimal arithmetic from 1 second to approximately 1 millisecond.

We claim:
1. An electrical pulse ratemeter comprising a digital register adapted to receive a train of electrical pulses and to add one unit to the number in the register for each pulse received, means for successively subtracting at predetermined intervals of time a number forming a constant fraction of the number instantaneously present in the digital register, said subtraction being repeated sufficiently to produce a substantially equilibrium value, and means for exhibiting a reading corresponding to the number forming the constant fraction so subtracted, said reading being a measure of the pulse arrival rate.

2. A ratemeter as claimed in claim 1 wherein said digital register comprises $2^n$ series-connected binary stages corresponding to the numerical sequence $2^0, 2^1, 2^2$ to $2^{2n-1}$, said subtraction means being operable to add to the digits in stages $2^0$ to $2^{n-1}$ of said register the 1 plus 1's complement of the number formed by the sequential digits in stages $2^n$ to $2^{2n-1}$, said digits forming the constant fraction $(\frac{1}{2})^n$ of the number instantaneously present in the register, said exhibiting means displaying the 1 and 0 states of the binary stages $2^n$ to $2^{2n-1}$, respectively.

3. A ratemeter as claimed in claim 2 comprising $2^n$ series-connected monostable circuits each associated with one of said $2^n$ binary stages, respectively, each said monostable circuit being connected to feed a pulse to its associated binary stage when actuated by a pulse from its preceding monostable circuit, the monostable circuit associated with binary stage $2^{2n-1}$ being connected to feed a pulse to binary stage $2^{2n-1}$ and to binary stage $2^0$, $n$ gates, each said gate being connected between one of the binary stages $2^0, 2^1, 2^2 \ldots 2^{n-1}$ and its associated monostable circuit, each gate being controlled by the binary stage $n$ stages later in said series of binary stages to open when its controlling binary stage is in the 0 state and to close when its controlling binary stage is in the 1 state, an input gate preceding binary stage $2^0$, means for closing said input gate for short time-periods separated by said predetermined time-intervals, and means for feeding a pulse during each said short time-period to the monostable circuit associated with said $2^0$ binary stage to actuate said series of monostable circuits.

4. A ratemeter as claimed in claim 3 wherein said means for closing said input gate comprises a constant-frequency oscillator, variable frequency-divider means connected to generate a single pulse for each predetermined number of oscillations of said oscillator, and means for applying said pulse to control said gate.

References Cited

UNITED STATES PATENTS

| | | | |
|---|---|---|---|
| 2,829,323 | 4/1958 | Steele | 235—152 |
| 2,880,934 | 4/1959 | Bensky et al. | 235—92 |
| 2,910,240 | 10/1959 | Havens | 235—174 |
| 3,155,822 | 11/1964 | Chiang | 235—173 |

OTHER REFERENCES

Martens: "Differential Counting With Reversible Decade Counting Circuits," The Review of Scientific Instruments, volume 20, number 6, June 1949, pp. 424–425.

Calson: "Steering Circuits Control Reversible Counters," Electronics, Jan. 1, 1960, pp. 86–88.

Leslie et al.: "A Fast Counter for Adding or Subtracting Randomly Related Pulse Trains," Electronic Engineering, April 1962, pp. 227–233.

Richards: "Aritmetic Operations in Digital Computers," 1955, Van Nostrand Co., Inc., New York, pp. 119–120, 124–127, and 133–135.

MALCOLM A. MORRISON, *Primary Examiner.*

M. J. SPIVAK, *Assistant Examiner.*